United States Patent
Otsuka et al.

(10) Patent No.: US 6,569,309 B2
(45) Date of Patent: May 27, 2003

(54) FUEL CELL TYPE REACTOR AND METHOD FOR PRODUCING A CHEMICAL COMPOUND BY USING THE SAME

(75) Inventors: Kiyoshi Otsuka, Toda (JP); Ichiro Yamanaka, Tokyo (JP); Ken Suzuki, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/971,928

(22) Filed: Oct. 9, 2001

(65) Prior Publication Data

US 2003/0029733 A1 Feb. 13, 2003

(30) Foreign Application Priority Data

Jul. 5, 2001 (JP) ........................................ 2001-204435

(51) Int. Cl.[7] ............................. C25B 3/00; H01M 8/04; H01M 8/10
(52) U.S. Cl. ...................... 205/455; 205/413; 205/439; 205/440; 205/441; 429/14; 429/15; 429/30
(58) Field of Search ............................ 429/14, 15, 30; 204/263, 265, 266, 267, 269, 275.1, 277, 278, DIG. 3, DIG. 4, 248, 413, 439, 464

(56) References Cited

U.S. PATENT DOCUMENTS 5,246,551 A * 9/1993 Pletcher et al. ............... 204/96
6,045,684 A * 4/2000 Wakita et al. ............... 205/466

OTHER PUBLICATIONS

Hashimoto et al., Preliminary text for the 84th Forum on Catalysis, 3C09, (1999). (With Partial English Translation) Month unavailable.
Yamanaka et al., J. Chem. Soc. Faraday Trans., vol. 90, No. 3, pp. 451–458, (1994). Month unavailable.
Otsuka et al., Electrochimica Acta., vol. 35, No. 2, pp. 319–322, (1990). Month unavailable.
Preliminary text for the 84th Forum on Catalysis, 3C09, (1999). Month unavailable.

* cited by examiner

Primary Examiner—Edna Wong
(74) Attorney, Agent, or Firm—Birch, Stewart, Kolasch & Birch, LLP (57) ABSTRACT

Disclosed is a fuel cell type reactor for performing an oxidation reaction of a system comprising a substrate, a reductant and an oxidant, comprising: a casing; an anode which comprises an anode active material and which is ion-conductive or active species-conductive; and a cathode which comprises a cathode active material and which is ion-conductive or active species-conductive, wherein the anode and the cathode are disposed in spaced relationship in the casing to partition the inside of the casing into an intermediate compartment between the anode and the cathode, an anode compartment on the outside of the anode and a cathode compartment on the outside of the cathode, and wherein the intermediate compartment has an inlet for an electrolyte solution and a substrate, the anode compartment has an inlet for a reductant, and the cathode compartment has an inlet for an oxidant.

8 Claims, 2 Drawing Sheets

FUEL CELL TYPE REACTOR AND METHOD FOR PRODUCING A CHEMICAL COMPOUND BY USING THE SAME

This nonprovisional application claims priority under 35 U.S.C. §119(a) on Patent Application No. 2001-204435 filed in JAPAN on Jul. 5, 2001, which is herein incorporated by reference.

BACKGROUND OF THE INVENTION

1. Field of the Invention

The present invention relates to a fuel cell type reactor and a method for producing a chemical compound by using the reactor. More particularly, the present invention is concerned with a fuel cell type reactor for performing an oxidation reaction of a system comprising a substrate, a reductant and an oxidant, comprising: a casing; an anode which comprises an anode active material and which is ion-conductive or active species-conductive; and a cathode which comprises a cathode active material and which is ion-conductive or active species-conductive, wherein the anode and the cathode are disposed in spaced relationship in the casing to partition the inside of the casing into an intermediate compartment between the anode and the cathode, an anode compartment on the outside of the anode and a cathode compartment on the outside of the cathode. The reactor of the present invention can be used for producing various chemical compounds which are useful in the chemical industry. The present invention is also concerned with a method for producing a chemical compound by performing an oxidation reaction, using the reactor of the present invention. The reactor of the present invention can be applied to various oxidation reactions, and is especially useful for performing selective oxidation reactions, for example, partial oxidation of an alkane, partial oxidation of an alcohol, epoxidation of an olefin, hydroxylation of an aromatic compound, partial oxidation of an amine and partial oxidation of a ketone. By using the reactor of the present invention, various chemical compounds having high values added thereto can be produced directly from a low-priced oxidant (such as oxygen), a reductant and a substrate, without using an expensive oxidizing agent, such as hydrogen peroxide or an organic or an inorganic peroxide. The reactor of the present invention is also applicable to various oxidative addition reactions, for example, a carbonylation reaction of an alcohol, a phenolic compound or an olefin; the Wacker reaction of an olefin; an acetoxylation reaction, oxychlorination reaction or coupling reaction of an olefin or an aromatic compound; and an esterification reaction of an alcohol. The reactor enables efficient and stable production of useful chemical compounds. For example, by using the reactor of the present invention, t-butylhydroperoxide can be synthesized in a single step by a selective oxidation reaction, from oxygen, t-butanol and hydrogen. t-Butyl-hydroperoxide is a useful chemical compound which is used as an oxidizing agent, a polymerization initiator, a curing agent and a desiccant in the chemical, pharmaceutical and food industries and the like.

2. Prior Art

Conventionally, oxidation reactions which are well known in the industry, especially a selective oxidation reaction and an oxidative addition reaction, have been carried out by employing the techniques as described below.

Useful chemical compounds can be efficiently produced under moderate conditions with high selectivity by performing a selective oxidation reaction, using an oxidizing agent (such as hydrogen peroxide or an organic or an inorganic peroxide) which can produce an active oxygen species (an electrophilic oxygen species) having high chemical potential (see, for example, "Shin Jikken Kagaku Koza 15, Sanka to Kangen I-2 (New Lecture on Experimental Chemistry 15, Oxidation and Reduction, I-2)", edited by Japan Chemical Society, p. 605, 1976, Japan; and "Catalytic Oxidations with Hydrogen Peroxide as Oxidant", G. Strukul, Kluwer Academic Publishers, 1992, the Netherlands). Examples of selective oxidation reactions include oxidation of an alkane, oxidation of an alcohol, epoxidation of an olefin, oxidation or ammoximation of a ketone, oxidation of an aldehyde, oxidation of an ether, hydroxylation of an aromatic compound, oxidation of an amine and oxidation of a sulfur compound.

The "selective oxidation reaction" mentioned herein means a reaction which proceeds in the presence of an electrophilic oxygen species, such as the selective oxidation reactions mentioned in the above-mentioned documents.

On the other hand, it is well known that, as a conventional method for producing hydrogen peroxide, which is a useful oxidizing agent as mentioned above, an autoxidation reaction using alkylanthraquinone is commercially used (see "Kagaku Binran, Oyo-kagaku-hen I (Chemical Handbook, Applied Chemistry I)", edited by Japan Chemical Society, p. 302, 1986, Japan). However, the conventional method for producing hydrogen peroxide is economically disadvantageous not only in that the method requires a large amount of an organic solvent and but also in that, due to the generation of various by-products and degradation of a catalyst, the method requires various additional steps for separation of by-products and for regeneration of the degraded catalyst. Therefore, it has been desired to develop a production method by which hydrogen peroxide can be produced at a low cost, as compared to the case of the conventional method.

In addition, as a useful organic peroxide, t-butylhydroperoxide is also known. Conventionally, t-butylhydroperoxide has been produced, for example, by a method in which t-butanol or isobutylene as a substrate, namely a raw material, is reacted with a strong acid, such as sulfuric acid, and hydrogen peroxide (see, for example, "Yuki-Kasankabutsu (Organic Peroxides)", edited by the Organic Peroxide Research Group, p. 220, 1972, Japan). However, the conventional method is disadvantageous from the viewpoint of economy and safety; specifically, the conventional method has disadvantages in that hydrogen peroxide (which is expensive) is necessary, and the raw material is reacted with a liquid mixture of a high concentration aqueous sulfuric acid (60 to 70 wt %) and a high concentration aqueous hydrogen peroxide (30 to 50 wt %).

For these reasons, from the practical and commercial viewpoint, it has been desired to develop a method by which various types of selective oxidation reactions can be performed by directly oxidizing a substrate with oxygen in the presence of a catalyst without using an expensive oxidizing agent, such as hydrogen peroxide. For example, a method for producing phenol directly from benzene and oxygen in the presence of a catalyst has long been studied. However, the reaction method which has been studied has the following problems. First, a high temperature is necessary for the reaction. Further, although various types of catalysts can catalyze the reaction, many of such catalysts pose a problem in that the reaction system containing such catalysts causes phenol as a reaction product to have higher reactivity than benzene as a substrate, so that, although the reaction rate of benzene can be increased, the selectivity for phenol is decreased. Thus, no method which is commercially employable has been developed. With respect not only to such reaction system (which causes phenol as a reaction product to have higher reactivity than benzene) but also to other oxidation reactions using oxygen, great efforts have been made for increasing the selectivity for a desired reaction product. However, there is no method which is satisfactory from the viewpoint of economy and safety. It is considered that the reason why such an oxidation reaction using oxygen does not proceed with high selectivity for a desired product is because, when oxygen molecules are activated by a catalyst, an electron transfer from the catalyst to the oxygen molecules inevitably occurs, so that oxygen molecules are mainly converted to nucleophilic oxygen anion active species, making it difficult for an electrophilic addition reaction to proceed (see Catalysis Today, 45, 3–12, 1998, the U.S.A.).

In recent years, in order to alleviate the above-mentioned problems, studies on a new method have been made for synthesizing a chemical compound, in which a catalyst system which is similar to a biological catalyst system is used. Monooxygenase, which is an enzyme present in the living body, activates an oxygen molecule by utilizing the reducing ability of NADPH. In imitation of this mechanism, in the synthetic chemistry, a method can be used in which oxygen and a reducing agent, such as hydrogen, carbon monoxide or aldehyde, are contacted with each other in the presence of a catalyst system, thereby generating an active oxygen species under moderate conditions. In this case, since energy necessary to cleave an oxygen bond is supplied through the oxidation of the reducing agent, an electrophilic active oxygen species can be selectively generated without using a large amount of energy. The present inventors previously proposed a method for producing phenol, comprising contacting oxygen, benzene and hydrogen with each other in the presence of an Eu-Ti-Pt catalyst (see "Dai 84-kai Shokubai Toronkai Yokou-shu 3F20 (the preliminary text for the 84th Forum on Catalysts, 3F20)", 1999, Japan). According to this method, phenol can be produced with high selectivity under moderate conditions from benzene and oxygen in a single step. With respect to the reaction in this method, it is presumed that oxygen undergoes partial reduction by hydrogen on the surface of the catalyst and is converted to an active oxygen species, which is effective for the hydroxylation of benzene, thereby exhibiting improved selectivity for phenol. However, this method has problems in that there is a great danger of explosion due to the presence of hydrogen, and the utility of hydrogen is low. In addition to this method, there are also known methods similar thereto, such as a method for producing phenol, comprising contacting oxygen, benzene and hydrogen with each other in the presence of a Pt—$V_2O_5$/$SiO_2$ catalyst (Appl. Catal., A, 131, 33, 1995, U.S.A.); a method for producing cyclohexene oxide, comprising contacting oxygen, cyclohexene and hydrogen in the presence of an Mn complex/Pt colloidal catalyst (J. Am. Chem. Soc., 101, 6456, 1979, U.S.A.); and a method for producing propylene oxide from propylene, for producing acetone from propane or for producing t-butanol from isobutane, which comprises subjecting a substrate to a gaseous phase oxidation with oxygen in the presence of hydrogen and an Au/$TiO_2$ catalyst ("Shokubai (Catalyst)", Vol. 37, No.2, 72, 1995, Japan). However, each of these methods has problems similar to the above-mentioned problems, and hence cannot be commercially practically employed.

Besides the selective oxidation reaction, the oxidative addition reaction is also known as a useful reaction in the chemical industry. The "oxidative addition reaction" mentioned herein means a condensation reaction of at least one chemical compound in the presence of oxygen. Examples of compounds to be condensed include various organic and inorganic compounds, such as an olefin, a diene, an alcohol, a phenolic compound, an aromatic compound, water, carbon monoxide, hydrogen halogenide, acetic acid and prussic acid. The oxidative addition reaction covers a wide variety of types of reactions.

By the oxidative addition reaction, useful chemical substances can be produced. Representative examples of oxidative addition reactions include carbonylation of an alcohol for synthesizing a dialkyl carbonate, carbonylation of a phenolic compound for synthesizing a diaryl carbonate, carbonylation of an olefin for synthesizing an ester, carbonylation of an olefin for synthesizing an unsaturated acid, and the Wacker reaction of an olefin for synthesizing an aldehyde or a ketone. Each of these reactions is performed in the presence of oxygen and a catalyst comprising an element (such as palladium) selected from the elements of the Groups 8, 9, 10 and 11 of the Periodic Table. Besides the above-mentioned reactions, there are also known other oxidative addition reactions, such as acetoxylation, oxychlorination and oxycyantion of an olefin or an aromatic compound, a coupling reaction of an olefin or an aromatic compound, and esterification of an alcohol. Thus, the oxidative addition reaction is highly useful in the organic chemical industry (see, for example, "Shokubai Koza Vol.8 (Kogyo Shokubai Hanno-hen 2), Kogyo Shokubai Hanno I (Lecture on Catalysts Vol.8 (Commercial Catalytic Reactions No.2), Commercial Catalytic Reactions I)", edited by Japan Catalyst Society, p. 196, 1985, Japan).

However, these many oxidative addition reactions have problems in that a lowering of the catalyst activity occurs during the reaction, that a corrosion of a reactor occurs due to a by-produced, chlorine-containing compound derived from a catalyst, that a large amount of energy is consumed due to the use of high reaction temperature and high reaction pressure, that a danger of explosion is present due to the mixing of a substrate and oxygen, and that the selectivity for and yield of a desired compound are low.

On the other hand, in recent years, studies have been made for producing a useful chemical compound under moderate conditions by using a fuel cell system. A fuel cell is a system which is intended to perform a process in which a fuel is electrochemically reacted with an oxidant through a diaphragm containing an electrolyte solution, thereby effecting an electrochemical complete combustion of the fuel, and a free energy change occurring during the electrochemical reaction is directly converted to electrical energy. In the operation of a fuel cell, an electron discharge reaction and an electron accepting reaction are, respectively, effected at an anode and a cathode which are connected to each other through an electron-conductive material in the outside of the fuel cell to form an external circuit, and a flow of electrons through the external circuit is obtained as an electric power. When a fuel cell is regarded as a chemical reactor for use in an organic synthesis, the reactor is a device which is capable, in principle, of both producing a useful chemical compound and providing electricity.

A method for effecting an organic synthesis by using a fuel cell system has the below-mentioned features 1) to 4), which are advantageous for commercial production of chemical compounds.

1) Since an active species can be separated and a special reaction zone can be formed, it becomes possible to perform a selective reaction, which is difficult to perform by an ordinary catalytic reaction.

2) The reaction rate and the selectivity can be easily electrically controlled.

3) When the external circuit is loaded, electricity can be obtained in addition to a desired chemical compound.

4) Since an oxidant, such as oxygen, and a reductant, such as hydrogen, are separated from each other by a diaphragm disposed therebetween, the danger of an explosion can be decreased.

Examples of selective oxidation reactions and oxidative addition reactions which are performed using a fuel cell system are as follows. Examples of selective oxidation reactions which are performed using a fuel cell system include (I) a hydroxylation reaction of benzene (Electrochimica Acta, Vol. 39, No. 17, 2545, 1994, Switzerland) and (II) a partial oxidation reaction of an alkane (J. Chem. Soc. Faraday Trans., 90(3), 451, 1994, England). Examples of oxidative addition reactions which are performed using a fuel cell system include (III) a carbonylation reaction of methanol (Electrochimica Acta, Vol. 39, No. 14, 2109, 1994, Switzerland) and (IV) the Wacker reaction of an ethylene (J. Chem. Soc., Chem. Commun., 1988, England).

For example, each of the fuel cell type reactors used in the above-mentioned documents (I), (III) and (IV) comprises a casing, an ion-conductive diaphragm (containing an electrolyte solution), an anode and a cathode, wherein the ion-conductive diaphragm is sandwiched between the anode and the cathode to form a laminate structure, and wherein the laminate structure is disposed in the middle of the inside of the casing to partition the inside of the casing into an anode compartment on the outside of the anode and a cathode compartment on the outside of the cathode. In operation, a substrate in the gaseous form is supplied to either the anode compartment or the cathode compartment. In addition, a reductant and an oxidant both in the gaseous form are, respectively, supplied to the anode compartment and the cathode compartment. A desired product is produced in the compartment where the substrate is supplied. In the document (I), benzene and oxygen both in the gaseous form are supplied to the cathode compartment, and hydrogen is supplied to the anode compartment, and phenol is produced in the cathode compartment. In the document (III), methanol and carbon monoxide both in the gaseous form are supplied to the anode compartment, and oxygen is supplied to the cathode compartment, and dimethyl carbonate is produced in the anode compartment. In the document (IV), ethylene and water both in the gaseous form are supplied to the anode compartment, and oxygen is supplied to the cathode compartment, and acetaldehyde is produced in the anode compartment. On the other hand, the fuel cell type reactor used in the document (II) comprises a casing, an ion-conductive diaphragm (containing an electrolyte solution), an anode and a cathode, wherein the ion-conductive diaphragm is sandwiched between the anode and the cathode to form a laminate structure, and wherein the laminate structure is disposed in the middle of the inside of the casing to partition the inside of the casing into an anode compartment on the outside of the anode and a cathode compartment on the outside of the cathode. In operation, cyclohexane as a substrate in the liquid form is supplied to the cathode compartment, and oxygen in the gaseous form is also supplied into the liquid phase (substrate) of the cathode compartment, and hydrogen is supplied to the anode compartment, and cyclohexanol is produced in the liquid phase of the cathode compartment.

However, methods for producing a chemical compound by using the above-mentioned conventional fuel cell type reactors have problems in that there is a danger of an explosion due to the reaction of a substrate and an oxidant, and there is a possibility of formation of a by-product due to a side reaction between a desired reaction product and an oxidant. Further, with respect to the method of the document (II) wherein oxygen in the gaseous form is blown into a liquid phase composed of a substrate, problems arise in that oxygen exhibits a poor solubility in the liquid phase (substrate) and hence the reaction rate becomes low and that the concentration of the desired reaction product in the liquid phase cannot become high.

Besides the studies shown in the above-described documents (I) to (IV), various other studies for applying a fuel cell system to a chemical synthesis have been reported in other documents. However, such other documents disclose reactors having a structure which is essentially the same as in the documents (I) to (IV), and such other documents disclose methods for producing a chemical compound by using the reactors respectively disclosed therein. Therefore, the teachings of such other documents are nothing more than the teachings of the documents (I) to (IV).

SUMMARY OF THE INVENTION

In this situation, the present inventors have made extensive and intensive studies with a view toward solving the above-mentioned problems of the prior art. As a result, it has unexpectedly been found that this objective can be attained by using a fuel cell type reactor for performing an oxidation reaction of a system comprising a substrate, a reductant and an oxidant, comprising: a casing; an anode which comprises an anode active material and which is ion-conductive or active species-conductive; and a cathode which comprises a cathode active material and which is ion-conductive or active species-conductive, wherein the anode and the cathode are disposed in spaced relationship in the casing to partition the inside of the casing into an intermediate compartment between the anode and the cathode, an anode compartment on the outside of the anode and a cathode compartment on the outside of the cathode, and wherein the intermediate compartment has an inlet for an electrolyte solution and a substrate, the anode compartment has an inlet for a reductant, and the cathode compartment has an inlet for an oxidant. That is, it has surprisingly been found that, by using the above-mentioned reactor for performing an oxidation reaction, various useful chemical compounds can be produced efficiently, safely and stably from a substrate, a reductant and an oxidant. The present invention has been completed, based on this novel finding.

Accordingly, it is an object of the present invention to provide a fuel cell type reactor for performing an oxidation reaction of a system comprising a substrate, a reductant and an oxidant, wherein the fuel cell type reactor can be used for producing various useful chemical compounds efficiently, safely and stably by the oxidation reaction.

It is another object of the present invention to provide a method for producing various useful chemical compounds efficiently, safely and stably, which comprises performing an oxidation reaction of a system comprising a substrate, a reductant and an oxidant by using the above-mentioned fuel cell type reactor.

The foregoing and other objects, features and advantages of the present invention will be apparent from the following detailed description and appended claims taken in connection with the accompanying drawings.

BRIEF DESCRIPTION OF THE DRAWINGS

In the drawings:

In FIG. 1 through FIG. 4, like parts and portions are designated by like numerals.

DESCRIPTION OF REFERENCE NUMBRALS

1: Anode compartment
2: Intermediate compartment (containing substrate+ electrolyte solution)
2A: Cathode-side electrolyte solution compartment
2B: Anode-side electrolyte solution compartment
3: Cathode compartment
4: Anode
5: Cathode
6: Inlet for a reductant (hydrogen)
7: Inlet for an oxidant (oxygen)
8: Inlet for a substrate (t-butanol) and an electrolyte solution
9: Lead wire
10: Ammeter
11: Constant-voltage generator
12: Diaphragm
13: Inlet for an electrolyte solution
14: Outlet for a reductant (hydrogen)
15: Outlet for an oxidant (oxygen)
21: Gold mesh
22: Teflon support plate A
23: Teflon support plate B
24: Teflon spacer
25: Silicone spacer

DETAILED DESCRIPTION OF THE INVENTION

In one aspect of the present invention, there is provided a fuel cell type reactor for performing an oxidation reaction of a system comprising a substrate, a reductant and an oxidant, comprising:
 a casing;
 an anode which comprises an anode active material and which is ion-conductive or active species-conductive; and
 a cathode which comprises a cathode active material and which is ion-conductive or active species-conductive,
 wherein the anode and the cathode are disposed in spaced relationship in the casing to partition the inside of the casing into an intermediate compartment between the anode and the cathode, an anode compartment on the outside of the anode and a cathode compartment on the outside of the cathode,
 the intermediate compartment having an inlet for an electrolyte solution and a substrate,
 the anode compartment having an inlet for a reductant,
 the cathode compartment having an inlet for an oxidant, and
 the anode and the cathode being connected to each other through an electron-conductive material in the outside of the casing.

In another aspect of the present invention, there is provided a method for producing a chemical compound by performing an oxidation reaction, which comprises:
 providing the above-mentioned reactor; and
 performing the following steps (1) to (4) in either order, or simultaneously with respect to at least two steps thereof,
  (1) introducing an electrolyte solution to the intermediate compartment,
  (2) introducing a substrate to the intermediate compartment,
  (3) introducing a reductant to the anode compartment, and
  (4) introducing an oxidant to the cathode compartment,
thereby producing a chemical compound from the substrate, the reductant and the oxidant in the intermediate compartment.

For easy understanding of the present invention, the essential features and various preferred embodiments of the present invention are enumerated below.

1. A fuel cell type reactor for performing an oxidation reaction of a system comprising a substrate, a reductant and an oxidant, comprising:
 a casing;
 an anode which comprises an anode active material and which is ion-conductive or active species-conductive; and
 a cathode which co cathode active material and which is ion-conductive or active species-conductive,
 wherein the anode and the cathode are disposed in spaced relationship in the casing to partition the inside of the casing into an intermediate compartment between the anode and the cathode, an anode compartment on the outside of the anode and a cathode compartment on the outside of the cathode,
 the intermediate compartment having an inlet for an electrolyte solution and a substrate,
 the anode compartment having an inlet for a reductant,
 the cathode compartment having an inlet for an oxidant, and
 the anode and the cathode being connected to each other through an electron-conductive material in the outside of the casing.

2. The reactor according to item 1 above, which further comprises an ion-conductive diaphragm disposed in the intermediate compartment to partition the intermediate compartment into an anode-side electrolyte solution compartment and a cathode-side electrolyte solution compartment which are, respectively, positioned between the anode and the diaphragm and between the cathode and the diaphragm, and
 wherein the cathode-side electrolyte solution compartment has the inlet for an electrolyte solution and a substrate, and the anode-side electrolyte solution compartment optionally has an inlet for an electrolyte solution.

3. A method for producing a chemical compound by performing an oxidation reaction, which comprises:
   providing the reactor of item 1 above; and
   performing the following steps (1) to (4) in either order, or simultaneously with respect to at least two steps thereof,
      (1) introducing an electrolyte solution to the intermediate compartment,
      (2) introducing a substrate to the intermediate compartment,
      (3) introducing a reductant to the anode compartment, and
      (4) introducing an oxidant to the cathode compartment,
   thereby producing a chemical compound from the substrate, the reductant and the oxidant in the intermediate compartment.
4. The method according to item 3 above, which further comprises applying a voltage between the anode and the cathode.
5. The method according to item 3 above, wherein the reductant is a hydrogen donor and the oxidant is oxygen gas.
6. The method according to item 5 above, wherein the substrate is t-butanol and the chemical compound produced is t-butylhydroperoxide.
7. A method for producing a chemical compound by performing an oxidation reaction, which comprises:
   providing the reactor of item 2 above, wherein, when the anode-side electrolyte solution compartment has no inlet for an electrolyte solution, the reactor is provided in such a condition that the anode-side electrolyte solution compartment contains an electrolyte solution, and
   performing the following steps (1') to (4') in either order, or simultaneously with respect to at least two steps thereof,
      (1') introducing an electrolyte solution to the anode-side electrolyte solution compartment, provided that when the anode-side electrolyte solution compartment has no inlet for an electrolyte solution, step (1') is omitted,
      (2') introducing an electrolyte solution and a substrate to the cathode-side electrolyte solution compartment,
      (3') introducing a reductant to the anode compartment, and;
      (4') introducing an oxidant to the cathode compartment, thereby producing a chemical compound from the substrate, the reductant and the oxidant in the cathode-side electrolyte solution compartment.
8. The method according to item 7 above, which further comprises applying a voltage between the anode and the cathode.
9. The method according to item 7 above, wherein the reductant is a hydrogen donor and the oxidant is oxygen gas.
10. The method according to item 9 above, wherein the substrate is t-butanol and the chemical compound produced is t-butylhydroperoxide.

Hereinbelow, the present invention is described in detail.

The present invention can solve not only the above-mentioned problems of the various conventional methods for producing a chemical compound by using a conventional catalyst, but also the above-mentioned problems of the conventional methods for producing a chemical compound by using a conventional fuel cell type reactor.

Particularly, the problems of the conventional fuel cell type reactors are solved by the fuel cell type reactor of the present invention and the method of the present invention for producing a chemical compound by using the reactor, wherein the reactor of the present invention has an intermediate compartment having an inlet for an electrolyte solution and a substrate between an anode and a cathode. Differing from the conventional fuel cell type reactors, the reactor of the present invention does not have a laminate structure in which a diaphragm containing an electrolyte solution or an ion-exchange polymer membrane is sandwiched between an anode and a cathode. The method of the present invention for producing a chemical compound by using the reactor of the present invention has advantages in that, differing from the case of the conventional fuel cell type reactors, a substrate and an oxidant can be prevented from directly contacting with each other and, hence, a danger of explosion can be removed; that a desired reaction product and an oxidant can be prevented from contacting with each other and, hence, a decomposition of a desired reaction product and the formation of a by-product, both due to a side reaction between a desired reaction product and an oxidant, can be prevented; and that there is no need to supply oxygen as an oxidant into a liquid phase, and a high concentration of oxygen can be directly contacted with an electrode, so that a desired reaction product can be produced at high rate and in high concentration. Therefore, by using the reactor of the present invention, a desired chemical compound can be produced safely, efficiently, with high selectivity and at low cost under moderate conditions. For example, as shown in the Examples described below, by using the fuel cell type reactor of the present invention, t-butylhydroperoxide can be produced, by a single-step reaction, from t-butanol, hydrogen and oxygen. Thus, by the present invention, not only can all problems of the above-mentioned conventional methods for producing a chemical compound be solved, but also a desired reaction product can be produced more economically than the conventional methods. Moreover, by using the fuel cell type reactor of the present invention, not only can a desired reaction product be obtained efficiently and safely, but also electricity can be obtained, if desired.

The method of the present invention for producing a chemical compound by using the reactor of the present invention is not limited to the production of t-butylhydroperoxide, and is also effectively applicable to the various selective oxidation reactions and various oxidative addition reactions as mentioned above under "Prior Art".

Figure 1:
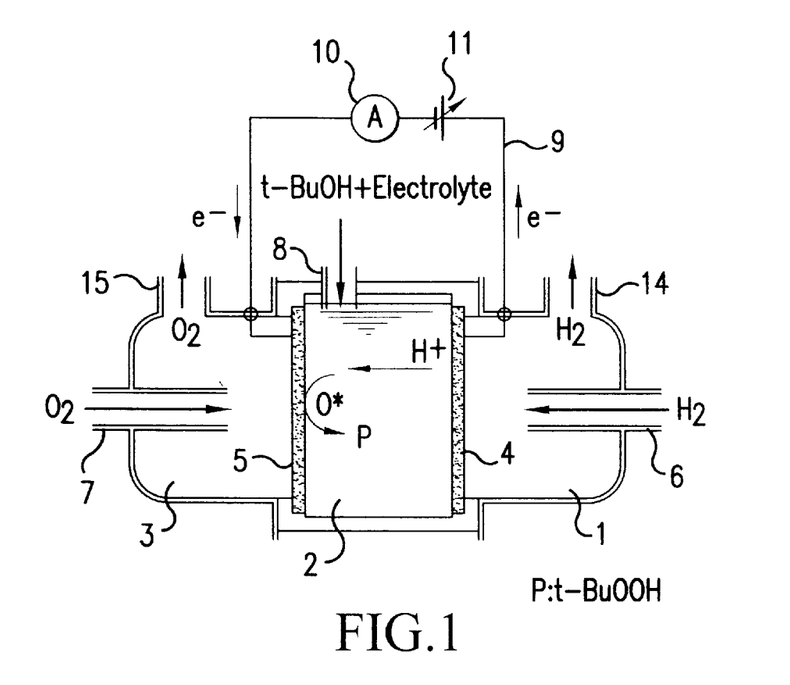
FIG. 1 is a diagram showing the principle of the reaction which is performed by the method of the present invention using the fuel cell type reactor of the present invention, in which t-butylhydroperoxide is produced from t-butanol, hydrogen and oxygen.

FIG. 1 is a diagram showing the principle of the reaction which is performed by the method of the present invention using the fuel cell type reactor of the present invention, in which t-butylhydroperoxide is produced from a substrate (t-butanol), a reductant (hydrogen) and an oxidant (oxygen). The reactor shown in FIG. 1 has a three-compartment structure comprising an intermediate compartment 2 formed between an anode 4 and a cathode 5, an anode compartment 1 on the outside of the anode 4 and a cathode compartment 3 on the outside of the cathode 5. The anode compartment 1 has an inlet 6 for a reductant and an outlet 14 for a reductant. The cathode compartment 3 has an inlet 7 for an oxidant and an outlet 15 for an oxidant. The intermediate compartment 2 has an inlet 8 for a substrate (t-butanol) and an electrolyte solution.

Figure 2:
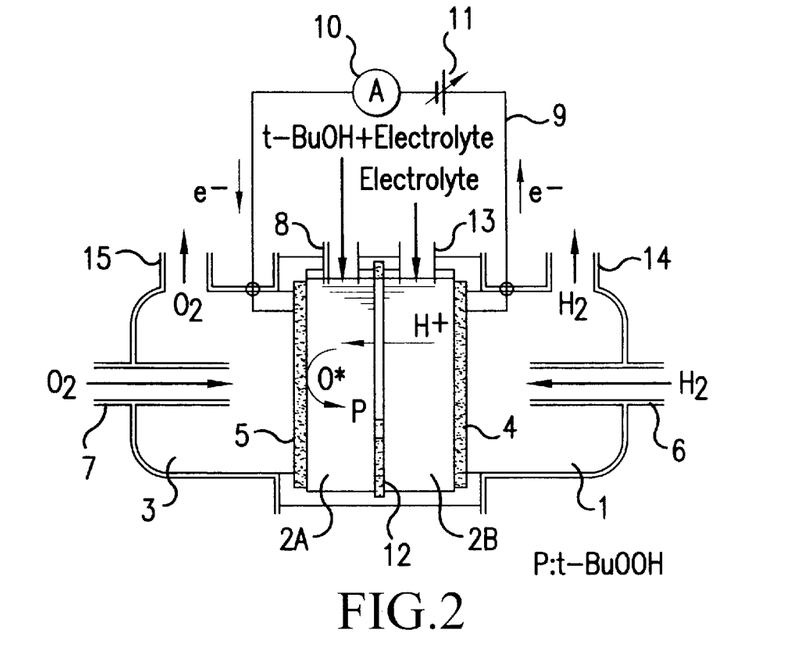
FIG. 2 is a diagram showing the principle of the reaction which is performed by the method of the present invention using the fuel cell type reactor of the present invention, in which t-butylhydroperoxide is produced from t-butanol, hydrogen and oxygen, wherein the fuel cell type reactor has an ion-conductive diaphragm 12 disposed in the intermediate compartment to partition the intermediate compartment into an anode-side electrolyte solution compartment 2B and a cathode-side electrolyte solution compartment 2A.

If desired, as shown in FIG. 2, the intermediate compartment can be partitioned by an ion-conductive diaphragm 12 into two compartments, i.e., a cathode-side electrolyte solution compartment 2A and an anode-side electrolyte solution compartment 2B. The reactor having such a diaphragm 12 partitioning the intermediate compartment into two electrolyte solution compartments 2A and 2B provides an advantage in that the diaphragm 12 can prevent any of a reactive species and a desired reaction product (which have been generated near the cathode 5 in the cathode-side electrolyte solution compartment 2A) from being diffused to the anode 4, so that a side reaction, such as a decomposition reaction, can be suppressed, thereby increasing the selectivity for and yield of a desired reaction product. This effect becomes especially remarkable when the reactor of the present invention is used for performing the selective oxidation reactions as mentioned above under "Prior Art".

Accordingly, in a preferred embodiment of the fuel cell type reactor of the present invention, the reactor further comprises an ion-conductive diaphragm disposed in the intermediate compartment to partition the intermediate compartment into an anode-side electrolyte solution compartment and a cathode-side electrolyte solution compartment which are, respectively, positioned between the anode and the diaphragm and between the cathode and the diaphragm, and wherein the cathode-side electrolyte solution compartment has the inlet for an electrolyte solution and a substrate, and the anode-side electrolyte solution compartment optionally has an inlet for an electrolyte solution.

For practicing the method of the present invention by using the above-mentioned preferred form of the fuel cell type reactor of the present invention having an ion-conductive diaphragm disposed in the intermediate compartment, the present invention provides a method for producing a chemical compound by performing an oxidation reaction, which comprises:

providing the above-mentioned preferred form of the reactor having an ion-conductive diaphragm disposed in the intermediate compartment, wherein, when the anode-side electrolyte solution compartment has no inlet for an electrolyte solution, the reactor is provided in such a condition that the anode-side electrolyte solution compartment contains an electrolyte solution, and performing the following steps (1') to (4') in either order, or simultaneously with respect to at least two steps thereof, (1') introducing an electrolyte solution to the anode-side electrolyte solution compartment, provided that when the anode-side electrolyte solution compartment has no inlet for an electrolyte solution, step (1') is omitted, (2') introducing an electrolyte solution and a substrate to the cathode-side electrolyte solution compartment, (3') introducing a reductant to the anode compartment, and (4') introducing an oxidant to the cathode compartment, thereby producing a chemical compound from the substrate, the reductant and the oxidant in the cathode-side electrolyte solution compartment.

As mentioned above, when the intermediate compartment 2 of the reactor is partitioned by the diaphragm 12 into the anode-side electrolyte solution compartment 2B and the cathode-side electrolyte solution compartment 2A, the substrate is introduced into the cathode-side electrolyte solution compartment 2A through the inlet 8 for an electrolyte solution and a substrate.

For convenience's sake, FIG. 1 and FIG. 2 show that "Electrolyte" is introduced through inlets 8 and 13. However, the term "Electrolyte" in FIGS. 1 and 2 means "Electrolyte solution".

Figure 3:
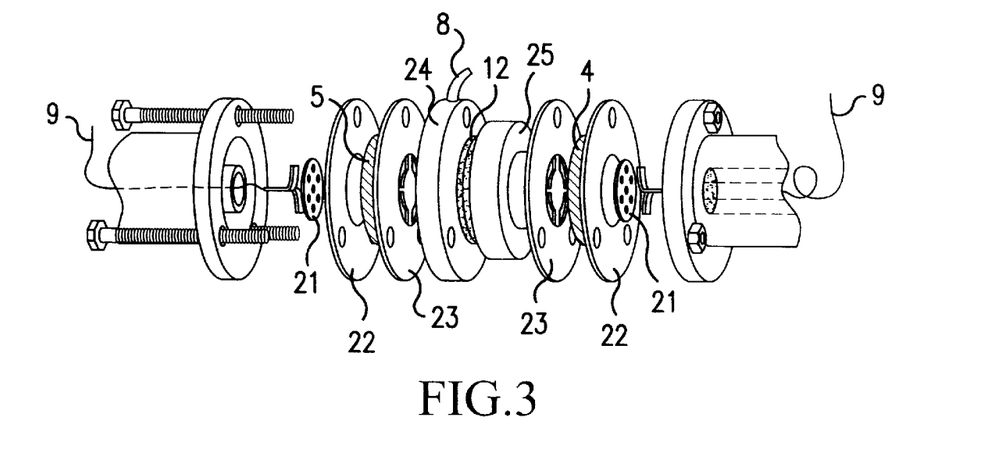
FIG. 3 is an exploded view of the fuel cell type reactor used in Example 2.
Figure 4:
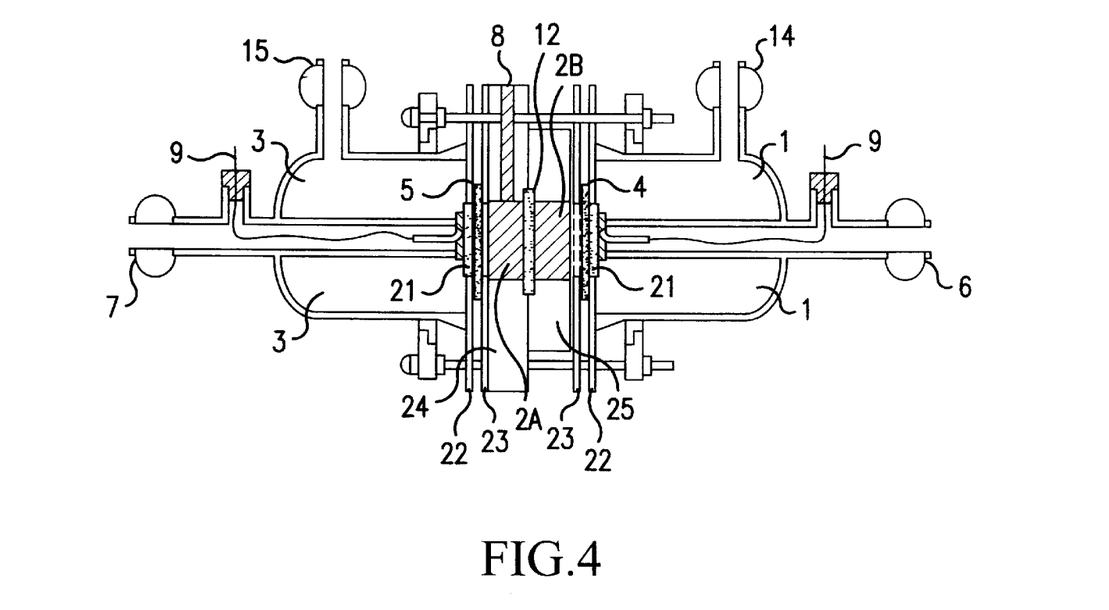
FIG. 4 is a diagrammatic view showing the inside of the fuel cell type reactor shown in FIG. 3.

FIG. 3 and FIG. 4 are, respectively, an exploded view of the fuel cell type reactor used in Example 2 and a diagrammatic view showing the inside of the same reactor, wherein the reactor is an example of the fuel cell type reactor of the present invention. As shown in FIG. 3 and FIG. 4, a metal mesh (such as a gold mesh) 21 for current collection is disposed on the outside of each of the anode 4 and the cathode 5, and the anode 4 and the cathode 5 are connected to each other through a lead wire 9 as an electron-conductive material in the outside of the casing. If desired, in order to accelerate the reaction, a voltage may be applied between the anode 4 and the cathode 5 by means of a constant-voltage generator 11 positioned in the outside of the casing. Further, if desired, electricity can be obtained from the reactor of the present invention by loading the external circuit during the operation of the reactor. Besides the above-mentioned parts indicated with reference numerals 1 to 15 and 21, the reactor of the present invention shown in FIG. 3 and FIG. 4 has a Teflon support plate A 22 and a Teflon support plate B 23 for supporting the electrodes 4 and 5, and also has a Teflon spacer 24 (containing the cathode-side electrolyte solution compartment 2A) and a silicone spacer 25 (containing the anode-side electrolyte solution compartment 2B).

The anode used in the present invention comprises an anode active material (serving as a catalyst) and is ion-conductive or active species-conductive. The cathode used in the present invention comprises a cathode active material (serving as a catalyst) and is ion-conductive or active species-conductive. The term "active species" used herein in connection with the anode means a reactive chemical species which is derived from a reductant and which moves through the anode from the anode compartment toward the intermediate compartment. The term "active species" used herein in connection with the cathode means a reactive chemical species which is derived from an oxidant and which moves through the cathode from the cathode compartment toward the intermediate compartment. In the present invention, each of the anode active material and the cathode active material can be selected from various materials depending on the type of the intended reaction. Usually, as each of the anode active material and the cathode active material, there can be used at least one material selected from the group consisting of metals, metal compounds, electrically conductive carbonaceous materials, silica, silica-alumina, zeolite and heteropolyacids. Herein, the anode active material and the cathode active material are frequently referred to collectively as the "electrode active material". Depending on the type of the reaction which is performed by using the reactor of the present invention, electrode active materials can be selected appropriately. With respect to a metal which is used as any of the anode active material and the cathode active material, there is no particular limitation as long as the metal has the above-mentioned properties required for the anode or the cathode. However, the metal is preferably selected from the Groups 1 to 16 of the Periodic Table. The metals can be used individually or in combination. When a metal is used as a metal compound, the compound may be any of an inorganic metal compound and an organic metal compound. Preferred examples of such metal compounds include a metal halide, a metal oxide, a metal hydroxide, a metal nitrate, a metal sulfate, a metal acetate, a metal phosphate, a metal carbonyl and a metal acetylacetonato. As the electrically conductive carbonaceous material used for an electrode active material, there can be mentioned various types of carbonaceous materials having electrical conductivity. Preferred examples of electrically conductive carbonaceous materials include an activated carbon, a carbon black, acetylene black, graphite, a carbon fiber, and a carbon whisker. These electrically conductive carbonaceous materials can be used individually or in combination.

When the selective oxidation reactions mentioned above under "Prior Art" are performed by using the reactor of the present invention and when the reductant is hydrogen, a conventional catalyst for converting hydrogen to a proton is used as an anode active material. Examples of such catalysts for converting hydrogen to a proton include the metals of the Groups 8 to 10 of the Periodic Table, and compounds of these metals. Preferably, such catalysts used as an anode active material are selected from Pt, Pd and compounds thereof. On the other hand, as a cathode active material, there can be used conventional catalysts for performing the selective oxidation reactions. Such cathode active materials are shown in the table below wherein they are classified with respect to the substrate and the reaction product.

| Substrate | Product | Cathode active material |
|---|---|---|
| Alkane | Alcohol and/or ketone compound, and organic acid | At least one material selected from metals, such as La, Sm, Ti, V, Nb, Cr, Mo, W, Fe, Ru, Os, Co, Rh, Ni, Pd, Cu and Se, compounds of these metals, silica, silica-alumina, zeolite and heteropolyacids |
| Olefin | Epoxy compound and glycol | At least one material selected from metals, such as Ti, V, Nb, Cr, Mo, W, Fe, Ru, Os, Co, Pd, Cu, Ag and Se, compounds of these metals, silica, silica-alumina, zeolite and heteropolyacids |
| Alcohol | Aldehyde, ketone, organic acid, and organic peroxide | At least one material selected from metals, such as Ti, V, Cr, Mo, W, Fe, Ru, Os, Co, Cu, Ag and Se, compounds of these metals, silica, silica-alumina, zeolite and heteropolyacids |
| Ketone | Aldehyde, ester, organic acid, and organic peroxide | At least one material selected from metals, such as Ti, V, Cr, Mo, W, Mn, Fe, Ru, Os, Co, Cu and Se, compounds of these metals, silica, silica-alumina, zeolite and heteropolyacids |
| Ketone and ammonia | Oxime compound and organic peroxide | At least one material selected from metals, such as La, Ti, V, Cr, Mo, W, Fe, Os, Co, Cu, Zn and Se, compounds of these metals, silica, silica-alumina, zeolite and heteropolyacids |
| Aromatic compound | Phenolic compound | At least one material selected from metals, such as La, Sm, Ti, V, Cr, Mo, W, Fe, Os, Co, Cu, Pd and Se, compounds of these metals, silica, silica-alumina, zeolite and heteropolyacids |
| Amine | Imine compound, oxime compound, nitro compound, and hydroxyl amine compound | At least one material selected from metals, such as Ti, Zr, Hf, V, Nb, Ta, Cr, Mo, W, Re, Fe, Os, Co, Cu, Zn, Cd and Se, compounds of these metals, silica, silica-alumina, zeolite and heteropolyacids |

When the substrate is an alcohol and the reaction product is an organic peroxide (as in the case of the oxidation of t-butanol, shown in the Examples described below), the above-mentioned conductive carbonaceous materials can be used as a cathode active material.

With respect to the oxidative addition reactions mentioned above under "Prior Art", when such reactions are performed by using the reactor of the present invention and when carbon monoxide is used as a reductant, an alcohol is used as a substrate, and oxygen is used as an oxidant, a carbonylation reaction occurs at the anode. In this case, as an anode active material, a conventional catalyst for a carbonylation reaction is used. A conventional catalyst for a carbonylation reaction comprises at least one material selected from metals, such as Pd and Cu, compounds of Pd and Cu, silica, silica-alumina, zeolite, heteropolyacids, and the above-mentioned electrically conductive carbonaceous materials. At the cathode, a reaction producing water from protons and oxygen occurs. Therefore, as a cathode active material, a conventional catalyst for this reaction is used. A conventional catalyst for this reaction comprises at least one material selected from metals, such as Fe, Co, Ni, Cu, Ru, Pt and Pd, compounds of these metals, silica, silica-alumina, zeolite, heteropolyacids, and the above-mentioned electrically conductive carbonaceous materials.

When the electrical conductivity of any of the anode active material and the cathode active material is unsatisfactory, an electrically conductive carbonaceous material can be incorporated into the anode active material and/or the cathode active material, wherein the electrically conductive carbonaceous material is intended to increase the electrical conductivity but not to serve as a catalyst. When an electrode active material which is a metal and/or a metal compound is used in combination with an electrically conductive carbonaceous material which is intended to increase the electrical conductivity of the electrode, it is preferred that the electrode is prepared by a method in which a particulate metal and/or a particulate metal compound is homogeneously mixed with a particulate, electrically conductive carbonaceous material, or a method in which a metal and/or a metal compound is carried on a particulate, electrically conductive carbonaceous material. These methods are preferred from the viewpoint of obtaining an electrode having a uniform composition and excellent electrical conductivity. The electrically conductive carbonaceous material can be selected from those as mentioned above.

The compositions of the anode active material and the cathode active material for use in the reactor of the present invention are as described hereinabove. When an electrode is prepared from a material in which a metal and/or a metal compound is used in combination with an electrically conductive carbonaceous material, it is preferred that the weight ratio of the former (in terms of the metal) to the total weight of the former and the latter is 0.01 to 50% by weight, more advantageously 0.1 to 30% by weight.

The Periodic Table mentioned herein is that prescribed in the IUPAC (International Union of Pure and Applied Chemistry) nomenclature system (1989).

As shown in the Examples described below, when t-butylhydroperoxide is produced by the method of the present invention, it is preferred that the anode contains platinum black and carbon fibers (in this case, carbon fibers are intended to increase the electrical conductivity but not to serve as an electrode active material). In the present invention, electrodes which are usually used in the conventional fuel cells and which are easily available may be used. It is preferred that the cathode is prepared from at least one electrically conductive carbonaceous material selected from those mentioned above (in this case, the at least one electrically conductive carbonaceous material is intended to serve as an electrode active material). In the present invention, the anode and the cathode are not limited to those described hereinabove.

It is preferred that, in addition to the above-described main components of the anode and cathode, the anode and the cathode also contain a water repellent. Examples of water repellents include polytetrafluoroethylene (PTFE), tetrafluoroethylene oligomer (TFEO), graphite fluoride ((CF)n) and pitch fluoride (FP). In the present invention, such a water repellent is effective for increasing the efficiency of the electrochemical reaction at a three-phase zone (gas-liquid-solid zone) formed by a gas (a reductant or an oxidant), a liquid (an electrolyte solution and a substrate) and a solid electrode (an anode or a cathode). Further, since a water repellent also serves as a binding agent for particles of an electrode active material, an electrode in a sheet form can be produced by a method in which a water repellent is mixed with the main components for an electrode, and the resultant mixture is molded into a sheet form by hot-pressing. It is preferred that the water repellent is used in an amount of 1 to 250% by weight, more advantageously 25 to 100% by weight, based on the weight of the electrode active material used.

Hereinabove, explanations have been made on the materials used for producing the electrodes used in the present invention and on the method for producing the electrodes. However, the materials and method for producing the electrodes are not limited to those described hereinabove.

The diaphragm 12 used to partition the intermediate compartment 2 of the reactor of the present invention is not particularly limited, except that the diaphragm is required to be ion conductive. Examples of employable diaphragms include a protonic acid-containing membrane which comprises an inorganic or organic porous support membrane containing, impregnated therein, an acidic electrolyte, such as phosphoric acid, hydrochloric acid or sulfuric acid; a solid electrolyte membrane, such as a membrane made of silica-alumina, H type zeolite, zirconium phosphate or a heteropolyacid; a perovskite type sintered body, such as $SrCeO_3$ or $BaCeO_3$; and an ion-exchange polymeric membrane, such as ion-exchange membranes of a polystyrene-sulfonic acid system or a fluorocarbon polymer-sulfonic acid system. In the present invention, it is preferred that the diaphragm 12 used to partition the intermediate compartment 2 is an ion-exchange polymeric membrane, such as Nafion (registered trade mark of DuPont, U.S.A.) which is based on a fluororesin membrane. As mentioned above, when the intermediate compartment 2 is partitioned by an ion-conductive diaphragm 12 into two compartments, i.e., a cathode-side electrolyte solution compartment 2A and an anode-side electrolyte solution compartment 2B, there can be obtained an advantage in that the diaphragm 12 can prevent any of a reactive species and a desired reaction product (which have been generated near the cathode 5 in the cathode-side electrolyte solution compartment 2A) from being diffused to the anode 4, so that a side reaction, such as a decomposition reaction, can be suppressed, thereby increasing the selectivity for and yield of a desired reaction product. This effect becomes especially remarkable when the reactor of the present invention is used for performing the selective oxidation reactions as mentioned above under "Prior Art".

The electron-conductive material (lead wire 9) used to connect the anode and the cathode to each other in the outside of the casing is not particularly limited except that it is required to be a good electron conductor. Examples of electron conductors include metals (such as gold, copper and the like) and various metal alloys. If desired, the electron-conductive material may be coated with an insulator.

In the present invention, various electrolyte solutions can be used. However, it is preferred to use a weak or strong electrolyte solution which is acidic, neutral or alkaline. Examples of electrolyte solutions include solutions of HCl, $H_2SO_4$, $H_3PO_4$, $HClO_4$, $HNO_3$, esters of these, an alkali metal halide, an alkali metal hydroxide, a quaternary tetraalkyl ammonium halide, a quaternary tetraalkyl ammonium perhalogenate, and $NH_3$; and water glass, city water and industrial water. These various electrolyte solutions (acidic, neutral or alkaline, and weak or strong) can be used individually or in combination. As a solvent for dissolving an electrolyte, there can be mentioned water, a non-aqueous solvent, such as an alcohol, methylene chloride, chloroform, acetic acid or acetonitrile, and a mixture of water and a non-aqueous solvent. As shown in the Examples described below, when t-butylhydroperoxide is produced by the method of the present invention, it is preferred that an aqueous solution of $H_2SO_4$ is used as an electrolyte solution. In addition, if desired, a catalyst which is effective for the intended reaction can be dispersed in the electrolyte solution. As such a catalyst, there can be used various metals or various metal compounds. Preferred examples of catalysts include metals which are selected from the Groups 1 to 16 of the Periodic Table, and compounds of the metals. Depending on the type of the intended reaction, silica, silica-alumina, zeolite and a heteropolyacid may also be dispersed as a catalyst in the electrolyte solution.

The reductant used in the present invention is not particularly limited except that the reductant is required to have the ability to donate an electron. Examples of usable reductants include hydrogen, carbon monoxide, an alcohol, an aldehyde, a hydroquinone, a saturated hydrocarbon, an unsaturated hydrocarbon, an aromatic compound, an amine and water. In the case of the selective oxidation reactions mentioned above under "Prior Art" and in the case of the selective oxidation reaction performed in the Examples described below wherein t-butylhydroperoxide is produced, a hydrogen donor which can produce a proton and an electron on the anode is used as a reductant. Examples of hydrogen donors include hydrogen, an alcohol, a hydroquinone and a saturated hydrocarbon. Commercially preferred is hydrogen, which is available at low cost. For an oxidative addition reaction, for example a carbonylation reaction, carbon monoxide is preferably used as a reductant. These reductants need not be pure and can be used in the form of a mixture with an inert gas, such as nitrogen gas, helium gas or argon gas.

The oxidant used in the present invention is not particularly limited except that the oxidant is required to have the ability to accept an electron. Examples of oxidants include air, oxygen and nitrogen oxide. Preferred are air and oxygen. These oxidants need not be pure and can be used in the form of a mixture with an inert gas, such as nitrogen gas, helium gas or argon gas.

In the method of the present invention, the reaction conditions (for example, the supply amounts of the substrate, reductant, oxidant and electrolyte solution, and the electric current) which vary depending on the size of the reactor can be appropriately selected in accordance with the size of the reactor.

The flow rate of each of the reductant and the oxidant which are, respectively, supplied to the anode and cathode compartments can be selected in accordance with the size of the reactor. Usually, the flow rate of each of the reductant and the oxidant is 0.1 ml/min to 10,000 ml/min, preferably 1 ml/min to 1,000 ml/min.

In the present invention, there can be used various types of substrates, such as the substrates which are employed in the selective oxidation reactions and the oxidative addition reactions both of which are explained above under "Prior Art". Examples of substrates include t-butanol (used in the Examples described below), and an alkane, an olefin, an alcohol, a phenol, a ketone, a mixture of a ketone and ammonia, an aldehyde, an ether, an aromatic compound, an amine, a thiol and a sulfide.

Examples of substrates suitable for a selective oxidation reaction include an alkane, an olefin, an alcohol, a ketone, a mixture of a ketone and ammonia, an aromatic compound and an amine. In the case of a selective oxidation reaction, the following substrates and products can be mentioned: by using an alkane as a substrate, there can be obtained an alcohol and/or a ketone, an organic acid or the like; by using an olefin as a substrate, there can be obtained an epoxy compound or the like; by using an alcohol as a substrate, there can be obtained an aldehyde, a ketone, an organic acid, an organic peroxide or the like; by using a ketone as a substrate, there can be obtained an aldehyde, an ester, an organic acid, an organic peroxide or the like; by using a mixture of a ketone and ammonia as a substrate, there can be obtained an oxime, an organic peroxide or the like; by using an aromatic compound as a substrate, there can be obtained a phenolic compound or the like; by using an amine as a substrate, there can be obtained an imine compound, an oxime, a nitro compound, a hydroxyl amine compound or the like.

Examples of substrates suitable for an oxidative addition reaction include an alkane, an olefin, an alcohol, a phenol, a ketone, an aromatic compound and an amine. In an oxidative addition reaction, for example, when carbon monoxide is supplied to the anode, and when an alcohol, a phenol, an olefin, an aromatic compound or an amine or a mixture of these is supplied as a substrate, a carbonyl compound corresponding to the substrate can be obtained.

Examples of alkanes include aliphatic alkanes, such as methane, ethane, propane, n-butane, isobutane, n-pentane, n-hexane, 2-methylpentane and 3-methylpentane, and cyclic alkanes, such as cyclopentane, cyclohexane, cycloheptane and cyclooctane.

Examples of olefins include aliphatic olefins, such as ethylene, propylene, butene, pentene, hexene, heptene, octene, decene, 3-methyl-1-butene, 2,3-dimethyl-1-butene and allyl chloride, cyclic olefins, such as cyclopentene, cyclohexene, cycloheptene, cyclooctene and cyclodecene, and aromatic olefins, such as styrene and $\alpha$-methylstyrene.

Examples of alcohols include saturated or unsaturated aliphatic alcohols, such as methanol, ethanol, n-propanol, isopropanol, n-butanol, s-butanol, t-butanol, n-pentanol, n-hexanol, n-heptanol, allyl alcohol and crotyl alcohol, saturated or unsaturated alicyclic alcohols, such as cyclopentanol, cyclohexanol, cycloheptanol, methylcyclohexanol, cyclohexene-3-ol and cyclohexene-4-ol, aliphatic or alicyclic polyhydric alcohols, such as ethylene glycol, propylene glycol, trimethylene glycol, 1,3-butanediol, 1,2-cyclohexanediol and 1,4-cyclohexanediol, and aromatic alcohols, such as benzyl alcohol, salicyl alcohol and benzhydrol.

Examples of phenols include phenol, cresol, xylenol, naphthol and anthrol (hydroxyanthracene), and derivatives thereof (a compound formed by replacing a hydrogen atom of the aromatic ring by an alkyl group, an aryl group, a halogen atom, a sulfonic acid group or the like).

Examples of ketones include aliphatic ketones, such as acetone, methyl ethyl ketone, diethyl ketone, dipropyl ketone and methyl propyl ketone, alicyclic ketones, such as cyclopentanone, cyclohexanone, cyclooctanone, 2-methylcyclohexanone and 2-ethylcyclohexanone, and aromatic ketones, such as acetophenone, propiophenone and benzophenone.

Examples of aromatic compounds include benzene, toluene, xylene, naphthalene, anthracene, and derivatives thereof obtained by a substitution of these aromatic compounds with an alkyl group, an aryl group, a halogen atom, a sulfonic acid group or the like.

Examples of amines include aliphatic amines, such as methylamine, ethylamine, propylamine, butylamine, dimethylamine and diethylamine, alicyclic amines, such as cyclopentylamine, cyclohexylamine and cycloheptylamine, cyclooctylamine, and aromatic amines, such as aniline and toluidine.

The substrate need not be purified and can be used in the form of mixtures with other organic compounds. In the method of the present invention, the concentration of the substrate in the electrolyte solution introduced to the intermediate compartment (or the cathode-side electrolyte solution compartment) of the reactor is 0.1 to 100% by weight, preferably 1 to 30% by weight.

With respect to the method for introducing the substrate to the reactor, there is no particular limitation. Examples of methods for introducing the substrate to the reactor include a method in which the electrolyte solution is first introduced to the intermediate compartment (or the cathode-side electrolyte solution compartment) and, then, the substrate is introduced to the intermediate compartment (or the cathode-side electrolyte solution compartment); a method in which the substrate is first introduced to the intermediate compartment (or the cathode-side electrolyte solution compartment) and, then, the electrolyte solution is introduced to the intermediate compartment (or the cathode-side electrolyte solution compartment); and a method in which the substrate and the electrolyte solution are simultaneously introduced to the intermediate compartment (or the cathode-side electrolyte solution compartment).

In the method of the present invention, if desired, the reaction can be accelerated by applying a voltage between the anode and the cathode. The voltage applied is usually in the range of from 0.1 to 10 V, preferably 0.2 to 2 V.

The reaction conditions used in the method of the present invention are as follows. The reaction temperature is usually selected from the range of from $-20$ to $200°$ C., preferably from $-5$ to $150°$ C. The pressure of each of the reductant and the oxidant when they are introduced to the reactor may usually be the atmospheric pressure. However, if desired, the pressure may be any of a superatmospheric pressure and a reduced pressure. Specifically, the superatmospheric pressure can be selected from the range of from more than the atmospheric pressure to 100 atm, and the reduced pressure can be selected from the range of from less than the atmospheric pressure to $10^{-2}$ torr or more. The reaction time is not particularly limited and can be appropriately selected in accordance with the desired values of the selectivity for and yield of the desired product. Usually, the reaction time is selected from the range of from several seconds to several hours.

The mode of the reaction is not particularly limited. The reaction can be performed continuously or batchwise. The continuous operation of the reaction can be performed as follows. Appropriate equipment for continuous operation of the reactor is attached to the reactor of the present invention. During the reaction, the substrate and the electrolyte solution are continuously introduced to the intermediate compartment (or the cathode-side electrolyte solution compartment), while continuously withdrawing a reaction mixture formed in the intermediate compartment (or the cathode-side electrolyte solution compartment) from the bottom of the compartment.

From the reaction mixture obtained in the reactor, the reaction product can be separated by a conventional separation method, such as distillation or extraction. Thus, the reaction product can be purified to a desired purity. With respect to the size of the reactor of the invention, there is no particular limitation. However, for example, the volume of the intermediate compartment can be selected from the range of from about 1 cm³ to about 10 m³, and the volumes of the anode compartment and cathode compartment can selected in accordance with the size of the intermediate compartment.

The principle of the reaction performed by the method of the present invention is explained below, taking as an example the reaction for producing t-butylhydroperoxide from t-butanol, hydrogen and oxygen. In this reaction, reactions shown by the below-mentioned formulae (1) to (3) proceed at a three-phase zone (gas-liquid-solid zone) formed by a gas (hydrogen or oxygen), a liquid (an electrolyte solution and t-butanol) and a solid electrode (anode 4 or cathode 5).

$$H_2 \rightarrow 2H^+ + 2e^- \qquad (1)$$

$$O_2 + 2H^+ + 2e^- \rightarrow O^*(\text{active species}) + H_2O \qquad (2)$$

$$(CH_3)_3COH + O^* \rightarrow (CH_3)_3COOH \qquad (3)$$

Specifically, hydrogen (as a hydrogen donor) supplied to the anode 4 releases a proton and an electron on the anode (formula (1)), and the proton moves to the electrolyte solution in the intermediate compartment 2.

When the intermediate compartment 2 is partitioned by the diaphragm 12 (proton-conductive diaphragm), the proton moves from the anode-side electrolyte solution compartment 2B to the cathode-side electrolyte solution compartment 2A through the diaphragm 12. On the other hand, the electron moves from the anode 4 to the cathode 5 via the external circuit positioned in the outside of the casing of the reactor. At the cathode 5, an active oxygen species is formed by the reaction of oxygen with the electron and the proton (formula (2)). Then, the active oxygen species reacts with t-butanol (as a substrate) in the electrolyte solution, thereby forming t-butylhydroperoxide as a desired product (formula (3)).

When the intermediate compartment 2 is partitioned by the ion-conductive diaphragm 12 into two compartments, i.e., the cathode-side electrolyte solution compartment 2A and the anode-side electrolyte solution compartment 2B, there can be obtained an advantage in that the diaphragm 12 can prevent any of an active oxygen species and t-butylhydroperoxide (desired reaction product) (which have been generated near the cathode 5 in the cathode-side electrolyte solution compartment 2A) from being diffused to the anode 4, so that a side reaction, such as a decomposition reaction, can be suppressed, thereby increasing the selectivity for and yield of the desired reaction product. In addition, when the reactor of the present invention is used, a substrate, a reductant and an oxidant are separately supplied to the reactor, so that the activity of each raw material can be increased, and both reactivity and selectivity can be increased, as compared to the case of the use of the conventional fuel cell type reactors disclosed in the documents (I) to (IV) described above under "Prior Art". In the reactor of the present invention, movement of a reactive chemical species (active species) to the above-mentioned three-phase zone occurs in both the anode 4 and the cathode 5. Therefore, in the present invention, it is required that both the anode and the cathode be ion-conductive or active species-conductive. The above-explained principle of the reaction involved in the method of the present invention is not limited to the reaction for producing t-butylhydroperoxide, but can also essentially apply to other various selective oxidation reactions.

According to the method of the present invention using a fuel cell type reactor having the above-mentioned structure, a useful compound can be produced safely, efficiently, with high selectivity and at low cost under moderate conditions. In addition, if desired, electricity can also be obtained. Moreover, the method of the present invention has advantages in that, by means of the anode and the cathode, the substrate, reductant and oxidant can be prevented from directly contacting with each other during the reaction and, hence, a danger of formation of an explosive gaseous mixture can be avoided; that the desired reaction product and the oxidant can be prevented from contacting with each other and, hence, the formation of a by-products due to a side reaction between the desired reaction product and the oxidant can be prevented; and that the reactivity of the raw materials and the selectivity for the desired reaction product become high.

BEST MODE FOR CARRYING OUT OF THE INVENTION

Hereinbelow, the present invention will be described in more detail with reference to the following Examples and Comparative Examples, which should not be constructed as limiting the scope of the present invention.

EXAMPLE 1

In Example 1, t-butylhydroperoxide was produced from oxygen, t-butanol and hydrogen by using a fuel cell type reactor of the present invention having the same structure as shown in FIGS. 3 and 4 except that the ion-conductive diaphragm 12 was not disposed in the intermediate compartment 2. The reactor has a three-compartment structure comprising an intermediate compartment 2 formed between an anode 4 and a cathode 5, an anode compartment 1 on the outside of the anode 4 and a cathode compartment 3 on the outside of the cathode 5. The intermediate compartment 2 has an inlet 8 for a substrate (t-butanol) and an electrolyte solution. The anode compartment 1 has an inlet 6 for a reductant (hydrogen) and an outlet 14 for an excess reductant. The cathode compartment 3 has an inlet 7 for an oxidant (oxygen) and an outlet 15 for an excess oxidant. A gold mesh 21 for current collection is disposed on the outside of each of the anode 4 and the cathode 5, and the anode 4 and the cathode 5 are connected to each other through a gold lead wire 9 and an ammeter 10 in the outside of the casing.

The anode 4 and the cathode 5 were prepared by the following methods. 20 mg of a platinum black powder (manufactured and sold by Wako Pure Chemical Industries, Ltd., Japan), 70 mg of a carbon fiber powder (manufactured and sold by Showa Denko K. K., Japan) and 7 mg of a PTFE powder (manufactured and sold by Daikin Industries, Ltd., Japan) were well mixed together. The resultant mixture was then subjected to hot pressing at 120° C. to mold it into a round sheet (thickness: about 1 mm, diameter: about 25 mm), to thereby obtain an anode. On the other hand, 30 mg of an activated carbon powder (manufactured and sold by Wako Pure Chemical Industries, Ltd., Japan), 50 mg of a carbon fiber powder (manufactured and sold by Showa Denko K. K., Japan) and 5 mg of a PTFE powder (manufactured and sold by Daikin Industries, Ltd., Japan)

were well mixed together. The resultant mixture was then subjected to hot pressing at 120° C. to mold it into a round sheet (thickness: about 1 mm, diameter: about 25 mm), to thereby obtain a cathode. Then, the thus obtained anode sheet and cathode sheet were securely disposed in spaced relationship in a casing to partition the inside of the casing into an intermediate compartment 2, an anode compartment 1 and a cathode compartment 3. The anode 4 and cathode 5 were connected to each other through a gold lead wire 9 (attached to current collector gold mesh 21 disposed on each electrode) and an ammeter 10 in the outside of the casing.

By using the above-described reactor, a reaction was performed as follows. There was provided a mixture of an aqueous $H_2SO_4$ solution (electrolyte solution) and t-butanol (substrate), wherein, in the mixture, the final normality of $H_2SO_4$ was 14.4 N and the final concentration of t-butanol was 0.212 M. 4 ml of this mixture of an aqueous $H_2SO_4$ solution and t-butanol was introduced to the intermediate compartment 2 of the reactor. Then, hydrogen gas and oxygen gas, both under the atmospheric pressure, were, respectively, introduced to the anode compartment 1 and the cathode compartment 3, each at a flow rate of 20 ml/min, thereby starting a reaction. The reaction was performed at 25° C. for 2 hours. During the reaction, it was observed that t-butylhydroperoxide was produced in the aqueous $H_2SO_4$ solution in the intermediate compartment 2 and that an electric current was generated.

During the reaction, the potential difference between the anode 4 and the cathode 5 was measured by a potentiometer (ELECTRON METER HE-104, manufactured and sold by Hokuto Denko Corporation, Japan), and the current flowing between these electrodes was measured by a non-resistance ammeter (ZERO SHUNT AMMETER HM-104, manufactured and sold by Hokuto Denko Corporation, Japan), and the quantity of electricity having flowed between these electrodes was measured by a coulomb meter (COULOMB METER HF-210, manufactured and sold by Hokuto Denko Corporation, Japan).

The reaction product obtained was analyzed by liquid chromatography, as follows. A sample of the reaction mixture was taken from the intermediate compartment 2. Then, 2 N sodium hydroxide was added to the sample while cooling the sample, so that the pH value of the resultant mixture became 2 or more. The analysis was performed by high performance liquid chromatography. As an internal standard, 10 μmol of benzoic acid was added to the sample. The analytical conditions of the liquid chromatography are as shown below.

Chromatograph: Shimadzu HPLC-10 series; SPD-10Avp, SLC10vp, and CTO-10ASvp (manufactured and sold by Shimadzu Corporation, Japan)

Column: Phenomenex LUNA 5u C18(2), 150 mm (length)×4.6 mm (inner diameter) (manufactured and sold by Phenomenex, U.S.A.)

Detector: UV detector (220 nm)

Mobile phase: Solution A: aqueous 10 mM phosphoric acid solution, Solution B: 90 v/v % aqueous acetonitrile solution Column temperature: 25° C.

The amount and production rate of t-butylhydroperoxide (TBHP) obtained, the current efficiency, and the current generated are shown in Table 1.

The current efficiency was obtained as follows. The quantity of electricity having flowed between the electrodes was measured by using a non-resistance ammeter and a coulomb meter. The current efficiency was calculated by the following formula.

Current efficiency=(amount of accumulated TBHP (mol)×100)/ (quantity of electricity having flowed (C)/96500 (C/mol))

The current value was obtained by converting the measured coulomb value (Q) to an average current value (I (A)=Q (C)/3600 (s)).

EXAMPLE 2

In Example 2, t-butylhydroperoxide was produced from oxygen, t-butanol and hydrogen by using a fuel cell type reactor of the present invention having the same structure as shown in FIGS. 3 and 4. In the reactor used in Example 2, the intermediate compartment 2 is partitioned by an ion-conductive diaphragm 12 into a cathode-side electrolyte solution compartment 2A and an anode-side electrolyte solution compartment 2B. The anode-side electrolyte solution compartment 2B does not have an inlet for an electrolyte solution. The cathode-side electrolyte solution compartment 2A has an inlet 8 for a substrate and an electrolyte solution. The reactor used in Example 2 has essentially the same structure as the reactor used in Example 1 except that the reactor used in Example 2 has the diaphragm 12 disposed in the intermediate compartment 2. The diaphragm 12 was Nafion 117 membrane (round shape, thickness: 0.2 mm, diameter: about 25 mm, manufactured and sold by DuPont, U.S.A.). Since the anode-side electrolyte solution compartment 2B of the reactor used in Example 2 had no inlet for an electrolyte solution, the reactor was provided in such a condition that the anode-side electrolyte solution compartment 2B contained an electrolyte solution (2 ml of 14.4 N aqueous $H_2SO_4$ solution) By using the above-described reactor, a reaction was performed in the same manner as in Example 1 except that 2 ml of a mixture of an aqueous $H_2SO_4$ solution and t-butanol, wherein, in the mixture, the final normality of $H_2SO$, was 14.4 N and the final concentration of t-butanol was 0.212 M, was introduced to the cathode-side electrolyte solution compartment 2A. The amount and production rate of t-butylhydroperoxide (obtained in the aqueous $H_2SO_4$ solution in the cathode-side electrolyte solution compartment 2A), the current efficiency, and the current generated are shown in Table 1.

COMPARATIVE EXAMPLE 1

The same procedure as in Example 1 was repeated except that the anode and the cathode were used in an open circuit condition (that is, the anode and the cathode were not connected to each other through an electron-conductive material). In this experiment, no reaction proceeded, and no formation of t-butylhydroperoxide was observed.

COMPARATIVE EXAMPLE 2

A reaction was performed in the same manner as in Example 1 except that a gaseous mixture of hydrogen gas and oxygen gas was introduced to the anode compartment 1. In this experiment, a reaction proceeded; however, t-butylhydroperoxide was not produced, but only water was obtained as a reaction product.

COMPARATIVE EXAMPLE 3

The same procedure as in Example 1 was repeated except that a gaseous mixture of hydrogen gas and oxygen gas was introduced to the cathode compartment 3. In this experiment, no reaction proceeded, and no formation of t-butylhydroperoxide was observed.

COMPARATIVE EXAMPLE 4

The same procedure as in Example 1 was repeated except:

that the introduction of hydrogen gas and oxygen gas to the anode compartment 1 and the cathode compartment 3, respectively, was not conducted, and that 1 ml of 30 wt % aqueous hydrogen peroxide was introduced to the intermediate compartment 2.

In this experiment, no reaction proceeded, and no formation of t-butylhydroperoxide was observed.

The results of the above-described Comparative Examples clearly show that the reaction in the method of the present invention proceeds by a fuel cell system and that a reactive species generated by a fuel cell reaction contributes to the reaction in the method of the present invention.

EXAMPLES 3 AND 4

A reaction was performed in the same manner as in Example 2 except that, in the production of the cathode 5, the activated carbon powder, carbon fiber powder and PTFE powder were used in the amounts indicated in Table 1. The results are shown in Table 1.

EXAMPLE 5

A reaction was performed in the same manner as in Example 4 except that the reaction time was changed to 6 hours. The results are shown in Table 1.

EXAMPLE 6

A reaction was performed in the same manner as in Example 2 except that, in the production of the cathode 5, the amount of the PTFE powder was changed to 8 mg. The results are shown in Table 1.

EXAMPLES 7 AND 8

A reaction was performed in the same manner as in Example 6 except that a voltage as indicated in Table 1 was applied between the electrodes by using a constant-voltage generator 11 (KIKUSUI PAB32-1.2A, manufactured and sold by Kikusui Kogyo, Japan). The results are shown in Table 1.

COMPARATIVE EXAMPLE 5

By using a conventional fuel cell type reactor which was produced in the below-described manner, a reaction for producing t-butylhydroperoxide from t-butanol, hydrogen and oxygen was performed. The conventional fuel cell type reactor was produced as follows. An ion-conductive diaphragm was prepared by a method in which a round silica wool sheet (thickness: 1.0 mm, diameter: 21 mm) was impregnated with an aqueous 85% phosphoric acid solution. The obtained ionconductive diaphragm was sandwiched between an anode and a cathode (which were the same as used in Example 1) to obtain a laminate having an "anode/diaphragm/cathode" structure. The obtained laminate was securely disposed in the middle of the inside of a casing to partition the inside of the casing into an anode compartment on the outside of the anode and a cathode compartment on the outside of the cathode. The electrodes were connected to each other through a gold lead wire in the outside of the casing.

By using the above-described conventional fuel cell type reactor, a reaction was performed as follows. There was provided a mixture of an aqueous $H_2SO_4$ solution (electrolyte solution) and t-butanol (substrate), wherein, in the mixture, the final normality of $H_2SO_4$ was 14.4 N and the final concentration of t-butanol was 0.212 M. 4 ml of this mixture of an aqueous $H_2SO_4$ solution and t-butanol was introduced to the cathode compartment of the reactor. Then, hydrogen gas and oxygen gas, both under the atmospheric pressure, were, respectively, introduced to the anode compartment and cathode compartment of the reactor, each at a flow rate of 20 ml/min, thereby starting a reaction. The reaction was performed at 25° C. for 2 hours. However, in the reaction, the production rate of t-butylhydroperoxide was as low as 0.01 $\mu mol \cdot cm^{-2} \cdot h^{-1}$ or less (the amount of t-butylhydroperoxide produced: 0.1 $\mu$mol). Further, almost no current generation was observed.

From the results of this Comparative Example 5, it is apparent that the reaction yield which can be achieved by the fuel cell type reactor of the present invention is superior to that achieved by the conventional fuel cell type reactors disclosed in the documents (I) to (IV) described above under "Prior Art".

TABLE 1

| Example Nos. | Cathode *1 | Voltage applied (V) | TBHP production rate *2 ($\mu mol \cdot cm^{-2} \cdot h^{-1}$) | Amount of TBHP produced ($\mu$mol) | Current efficiency (%) | Current (mA $cm^{-2}$) |
|---|---|---|---|---|---|---|
| 1 | AC (30) + CF (50) + PTFE (5) | — | 0.3 | 2.9 | 0.8 | 1.9 |
| 2 | AC (30) + CF (50) + PTFE (5) | — | 5.2 | 51.0 | 1.0 | 29.5 |
| 3 | AC (30) + CF (50) + PTFE (60) | — | 8.0 | 78.4 | 8.8 | 4.9 |
| 4 | AC (40) + CF (40) + PTFE (60) | — | 10.3 | 100.9 | 4.8 | 11.4 |
| 5 | AC (30) + CF (50) + PTFE (60) | — | 25.7 | 755.6 | 5.7 | 5.0 |
| 6 | AC (30) + CF (50) + PTFE (8) | — | 7.2 | 70.6 | 9.4 | 4.1 |
| 7 | AC (30) + CF (50) + PTFE (8) | 0.35 | 14.8 | 145.0 | 16.6 | 4.9 |
| 8 | AC (30) + CF (50) + PTFE (8) | 0.90 | 22.8 | 223.4 | 5.7 | 21.3 |

Note)
*1 Composition of cathode (amount in mg)
AC: activated carbon, CF: carbon fiber, PTFE: polytetrafluoroethylene
*2 TBHP: t-butylhydroperoxide

INDUSTRIAL APPLICABILITY

As described hereinabove, by using the fuel cell type reactor of the present invention having a specific structure, a useful chemical compound can be produced safely, efficiently, with high selectivity and at low cost under moderate conditions. In addition, if desired, electricity can also be obtained. The present invention can solve the various problems of the conventional processes for producing a chemical compound by using a catalyst, i.e., the problems that it is necessary to use an expensive oxidant, that a lowering of the catalyst activity occurs, that the selectivity for and yield of a desired compound become low, that complicated operations are necessary, and that a large amount of energy is consumed. Further, the reactor of the present invention has advantages in that, by means of the anode and the cathode, the substrate, reductant and oxidant can be prevented from directly contacting with each other during the reaction and, hence, a danger of formation of an explosive gaseous mixture can be avoided; that the desired reaction product and the oxidant can be prevented from contacting with each other and, hence, the formation of a by-product due to a side reaction between the desired reaction product and the oxidant can be prevented; and that the reactivity of the raw materials and the selectivity for the desired reaction product become high.

The fuel cell type reactor of the present invention is especially useful for performing various selective oxidation reactions, such as, partial oxidation of an alkane, partial oxidation of an alcohol, epoxidation of an olefin, hydroxylation of an aromatic compound, and partial oxidation of an amine, and for performing various oxidative addition reactions, such as a carbonylation reaction of an alcohol or a phenolic compound. For example, by using the reactor of the present invention, t-butylhydroperoxide can be produced in a single step by a selective oxidation reaction, from t-butanol, hydrogen and oxygen under moderate conditions without using an expensive oxidant, such as hydrogen peroxide.

What is claimed is:

1. A method for producing a chemical compound by an oxidation reaction, which comprises:
    providing a fuel cell reactor comprising:
        a casing,
        an anode which comprises an anode active material and which is ion-conductive or active species-conductive, and
        a cathode which comprises a cathode active material and which is ion-conductive or active species-conductive,
        wherein said anode and said cathode are disposed in spaced relationship in said casing to partition the inside of said casing into an intermediate compartment between said anode and said cathode, an anode compartment on the outside of said anode and a cathode compartment on the outside of said cathode,
        said intermediate compartment having an inlet for an electrolyte solution and a substrate,
        said anode compartment having an inlet for a reductant,
        said cathode compartment having an inlet for an oxidant, and
        said anode and said cathode being connected to each other through an electron-conductive material in the outside of said casing; and
    performing the following steps (1) to (4) in either order, or simultaneously with respect to at least two steps thereof,
        (1) introducing an electrolyte solution to said intermediate compartment,
        (2) introducing a substrate to said intermediate compartment,
        (3) introducing a reductant to said anode compartment, and
        (4) introducing an oxidant to said cathode compartment, thereby performing an oxidation reaction of a system comprising said substrate, said reductant and said oxidant to produce a chemical compound in said intermediate compartment,
        wherein said oxidation reaction is selected from the group consisting of a selective oxidation reaction and an oxidative addition reaction, wherein said selective oxidation reaction is defined as an oxidation reaction which proceeds in the presence of an electrophilic oxygen species, and said oxidative addition reaction is defined as a condensation reaction of at least one chemical compound in the presence of oxygen.

2. The method according to claim 1, which further comprises applying a voltage between said anode and said cathode.

3. The method according to claim 1 or 2 wherein, when said oxidation reaction is a selective oxidation reaction,
    said substrate is selected from the group consisting of an alkane, an olefin, an alcohol, a ketone, a mixture of a ketone and ammonia, an aromatic compound and an amine,
    said reductant is a hydrogen donor which is selected from the group consisting of hydrogen, an alcohol, a hydroquinone and a saturated hydrocarbon, and
    said oxidant is selected from the group consisting of air, oxygen gas and nitrogen oxide; and
    wherein, when said oxidation reaction is-an oxidative addition reaction,
    said substrate is selected from the group consisting of an alkane, an olefin, an alcohol, a phenol, a ketone, an aromatic compound and an amine,
    said reductant is selected from the group consisting of carbon monoxide, an alcohol, an aldehyde, a saturated hydrocarbon, an unsaturated hydrocarbon, an aromatic compound, an amine and water, and
    said oxidant is selected from the group consisting of air, oxygen gas and nitrogen oxide.

4. The method according to claim 3, wherein said oxidation reaction is a selective oxidation reaction, wherein said substrate is t-butanol, said reductant is said hydrogen donor, said oxidant is oxygen gas, and said chemical compound produced is t-butylhydroperoxide.

5. A method for producing a chemical compound by performing an oxidation reaction, which comprises:
    providing a fuel cell reactor comprising:
        a casing,
        an anode which comprises an anode active material and which is ion-conductive or active species-conductive,
        a cathode which comprises a cathode active material and which is ion-conductive or active species-conductive, and
        an ion-conductive diaphragm,
        wherein said anode and said cathode are disposed in spaced relationship in said casing to partition the inside of said casing into an intermediate compartment between said anode and said cathode, an anode compartment on the outside of said anode and a cathode compartment on the outside of said cathode,
        wherein said ion-conductive diaphragm is disposed in said intermediate compartment to partition the intermediate compartment into an anode-side electrolyte solution compartment and a cathode-side electrolyte solution compartment which are, respectively, positioned between said anode and said diaphragm and between said cathode and said diaphragm, and
        wherein said cathode-side electrolyte solution compartment has an inlet for an electrolyte solution and a substrate, and said anode-side electrolyte solution compartment optionally has an inlet for an electrolyte solution,
        said anode compartment having an inlet for a reductant,
        said cathode compartment having an inlet for an oxidant, and said anode and said cathode being connected to each other through an electron-conductive material in the outside of said casing, wherein, when said anode-side electrolyte solution compartment has no inlet for an electrolyte solution, the reactor is provided in such a condition that the anode-side electrolyte solution compartment contains an electrolyte solution, and performing the following steps (1') to (4') in either order, or simultaneously with respect to at least two steps thereof, (1') introducing an electrolyte solution to said anode-side electrolyte solution compartment, provided that when said anode-side electrolyte solution compartment has no inlet for an electrolyte solution, step (1') is omitted, (2') introducing an electrolyte solution and a substrate to said cathode-side electrolyte solution compartment, (3') introducing a reductant to said anode compartment, and (4') introducing an oxidant to said cathode compartment, thereby producing a chemical compound from said substrate, said reductant and said oxidant in said cathode-side electrolyte solution compartment.

6. The method according to claim 5, which further comprises applying a voltage between said anode and said cathode.

7. The method according to claim 5 or 6 wherein said reductant is a hydrogen donor and said oxidant is oxygen gas.

8. The method according to claim 7, wherein said substrate is t-butanol and said chemical compound produced is t-butylhydroperoxide.

* * * * *